US008028251B2

(12) United States Patent
Park et al.

(10) Patent No.: US 8,028,251 B2
(45) Date of Patent: Sep. 27, 2011

(54) TOUCH SCREEN DEVICE AND METHOD OF SELECTING FILES THEREON

(75) Inventors: Ho Joo Park, Seoul (KR); Ji Suk Chae, Seoul (KR); Young Ho Ham, Yongin (KR); Kyung Hee Yoo, Seoul (KR); Ji Ae Kim, Seoul (KR); Yu Mi Kim, Seongnam (KR); Sang Hyun Shin, Seoul (KR); Seung Jun Bae, Busan (KR); Yoon Hee Koo, Sacheon (KR); Jun Hee Kim, Seongnam (KR); Seong Cheol Kang, Osan (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 11/646,598

(22) Filed: Dec. 28, 2006

(65) Prior Publication Data

US 2007/0277126 A1    Nov. 29, 2007

(30) Foreign Application Priority Data

May 24, 2006 (KR) .......................... 10-2006-0046697
May 24, 2006 (KR) .......................... 10-2006-0046699

(51) Int. Cl.
*G06F 3/033* (2006.01)
(52) U.S. Cl. .......................................... 715/863; 715/784
(58) Field of Classification Search .................. 715/863, 715/784
See application file for complete search history.

(56) References Cited

U.S. PATENT DOCUMENTS

| 5,140,678 A | 8/1992 | Torres |
| 5,191,645 A | 3/1993 | Carlucci et al. |
| 5,495,566 A * | 2/1996 | Kwatinetz ...................... 715/785 |
| 5,523,775 A * | 6/1996 | Capps ............................ 345/179 |
| 5,526,011 A | 6/1996 | Hix et al. |
| 5,548,705 A * | 8/1996 | Moran et al. ................... 715/863 |
| 5,559,944 A | 9/1996 | Ono |
| 5,570,113 A * | 10/1996 | Zetts ............................. 345/173 |
| 5,586,235 A | 12/1996 | Kauffman |

(Continued)

FOREIGN PATENT DOCUMENTS

AU    2006330724    7/2007

(Continued)

OTHER PUBLICATIONS

Office Action dated Nov. 13, 2009 for U.S. Appl. No. 11/646,613.

(Continued)

*Primary Examiner* — Ryan F Pitaro
*Assistant Examiner* — Le Nguyen
(74) *Attorney, Agent, or Firm* — Ked & Associates LLP

(57) ABSTRACT

A touch screen device and a method of operation are provided. The device and method allow for scrolling and selection of files from a file list, and for skipping or reversing an execution order of the selected files simply by performing a drag on a touch screen. The method of selecting files on the touch screen device includes detecting a diagonal drag on a screen, selecting file(s) included within a corresponding range, and skipping file(s) within the range. The method may also include changing an execution order of the selected file(s) when a drag with a return trajectory is detected. The method may also include scrolling through the file list in accordance with a direction and speed of the drag. The device and method allows a plurality of files to be selected and skipped at a time, and a desired file to be rapidly and easily located.

23 Claims, 9 Drawing Sheets

U.S. PATENT DOCUMENTS

| | | | |
|---|---|---|---|
| 5,592,608 A * | 1/1997 | Weber et al. | 715/863 |
| 5,596,699 A | 1/1997 | Driskell | |
| 5,757,368 A | 5/1998 | Gerpheide et al. | |
| 5,794,127 A | 8/1998 | Lansang | |
| 5,796,406 A * | 8/1998 | Shigematsu et al. | 715/863 |
| 5,821,936 A | 10/1998 | Shaffer et al. | |
| 5,831,616 A | 11/1998 | Lee | |
| 5,903,267 A | 5/1999 | Fisher | |
| 6,094,197 A * | 7/2000 | Buxton et al. | 715/863 |
| 6,097,387 A * | 8/2000 | Sciammarella et al. | 715/784 |
| 6,107,997 A | 8/2000 | Ure | |
| 6,121,960 A | 9/2000 | Carroll et al. | |
| 6,259,436 B1 | 7/2001 | Moon et al. | |
| 6,310,615 B1 | 10/2001 | Davis et al. | |
| 6,334,003 B1 * | 12/2001 | Yokota | 382/313 |
| 6,433,801 B1 | 8/2002 | Moon et al. | |
| 6,459,442 B1 * | 10/2002 | Edwards et al. | 715/863 |
| 6,476,796 B1 | 11/2002 | Kuzunuki et al. | |
| 6,525,749 B1 * | 2/2003 | Moran et al. | 715/863 |
| 6,560,281 B1 | 5/2003 | Black et al. | |
| 6,724,370 B2 | 4/2004 | Dutta et al. | |
| 6,738,050 B2 | 5/2004 | Comiskey et al. | |
| 6,753,892 B2 | 6/2004 | Chung | |
| 6,765,557 B1 | 7/2004 | Segal et al. | |
| 6,883,140 B1 | 4/2005 | Acker et al. | |
| 6,883,145 B2 | 4/2005 | Jaeger | |
| 6,900,835 B2 | 5/2005 | Cazier et al. | |
| 6,940,494 B2 | 9/2005 | Hoshino et al. | |
| 6,957,395 B1 | 10/2005 | Jobs et al. | |
| 6,958,749 B1 | 10/2005 | Matsushita et al. | |
| 6,965,377 B2 | 11/2005 | Yanagisawa et al. | |
| 7,015,932 B1 | 3/2006 | Koike et al. | |
| 7,031,756 B1 | 4/2006 | Sim et al. | |
| 7,035,720 B2 | 4/2006 | Taxis | |
| 7,046,230 B2 | 5/2006 | Zadesky et al. | |
| 7,047,503 B1 * | 5/2006 | Parrish et al. | 715/863 |
| 7,158,913 B2 | 1/2007 | Park et al. | |
| 7,162,685 B2 | 1/2007 | Saito | |
| 7,164,410 B2 * | 1/2007 | Kupka | 345/156 |
| 7,164,432 B1 | 1/2007 | Amemiya | |
| 7,242,323 B2 | 7/2007 | Sato et al. | |
| 7,345,671 B2 | 3/2008 | Robbin et al. | |
| 7,348,967 B2 | 3/2008 | Zadesky et al. | |
| 7,406,666 B2 | 7/2008 | Davis et al. | |
| 7,434,177 B1 | 10/2008 | Ording et al. | |
| 7,456,823 B2 | 11/2008 | Poupyrev et al. | |
| 7,469,388 B1 * | 12/2008 | Baudisch et al. | 715/856 |
| 7,486,279 B2 | 2/2009 | Wong et al. | |
| 7,509,588 B2 | 3/2009 | Van Os et al. | |
| 2001/0019374 A1 | 9/2001 | Izumi et al. | |
| 2002/0011990 A1 | 1/2002 | Anwar | |
| 2002/0015064 A1 | 2/2002 | Robotham et al. | |
| 2002/0103616 A1 | 8/2002 | Park et al. | |
| 2002/0149569 A1 | 10/2002 | Dutta et al. | |
| 2003/0076306 A1 | 4/2003 | Zadesky et al. | |
| 2003/0142123 A1 | 7/2003 | Malamud et al. | |
| 2003/0174149 A1 | 9/2003 | Fujisaki et al. | |
| 2003/0234772 A1 | 12/2003 | Zhang et al. | |
| 2004/0056839 A1 | 3/2004 | Yoshihara | |
| 2004/0095395 A1 * | 5/2004 | Kurtenbach | 345/810 |
| 2004/0100479 A1 | 5/2004 | Nakano et al. | |
| 2005/0024322 A1 | 2/2005 | Kupka | |
| 2005/0024341 A1 | 2/2005 | Gillespie et al. | |
| 2005/0047629 A1 | 3/2005 | Farrell et al. | |
| 2005/0176502 A1 | 8/2005 | Nishimura et al. | |
| 2005/0193351 A1 | 9/2005 | Huoviala | |
| 2005/0251748 A1 * | 11/2005 | Gusmorino et al. | 715/713 |
| 2006/0013079 A1 | 1/2006 | Rekimoto | |
| 2006/0026535 A1 | 2/2006 | Hotelling et al. | |
| 2006/0026536 A1 | 2/2006 | Hotelling et al. | |
| 2006/0085767 A1 * | 4/2006 | Hinckley et al. | 715/863 |
| 2006/0159279 A1 | 7/2006 | Kuo et al. | |
| 2006/0256091 A1 | 11/2006 | Hino | |
| 2006/0271947 A1 | 11/2006 | Lienhart et al. | |
| 2007/0018968 A1 | 1/2007 | Iwamoto et al. | |
| 2007/0030257 A1 | 2/2007 | Bhogal et al. | |
| 2007/0033539 A1 | 2/2007 | Thielman et al. | |
| 2007/0075980 A1 | 4/2007 | Hsieh et al. | |
| 2007/0136690 A1 | 6/2007 | MacLaurin et al. | |
| 2007/0146544 A1 | 6/2007 | Liu et al. | |
| 2007/0150842 A1 | 6/2007 | Chaudhri et al. | |
| 2007/0180392 A1 | 8/2007 | Russo | |
| 2007/0273663 A1 | 11/2007 | Park et al. | |
| 2008/0150905 A1 | 6/2008 | Grivna et al. | |
| 2009/0119613 A1 * | 5/2009 | Nakaya | 715/784 |

FOREIGN PATENT DOCUMENTS

| | | |
|---|---|---|
| EP | 1 037 135 | 9/2000 |
| GB | 2329813 | 3/1999 |
| JP | 05-158616 | 6/1993 |
| JP | 2002041242 | 2/2002 |
| TW | 580636 | 3/2004 |
| TW | 580652 | 3/2004 |
| TW | 583552 | 4/2004 |
| TW | 200406734 | 5/2004 |
| TW | 200410853 | 7/2004 |
| TW | I236630 | 7/2005 |
| TW | M282290 | 12/2005 |
| WO | WO 00/38042 | 6/2000 |
| WO | WO 00/75766 | 12/2000 |
| WO | WO2005/073954 | 8/2005 |

OTHER PUBLICATIONS

Office Action dated Nov. 13, 2009 for U.S. Appl. No. 11/785,405.
Office Action dated Oct. 20, 2009 for U.S. Appl. No. 11/646,604.
Office Action dated Sep. 18, 2009 for U.S. Appl. No. 11/646,586.
Office Action dated Nov. 3, 2009 for U.S. Appl. No. 11/785,402.
Office Action dated Nov. 13, 2009 for U.S. Appl. No. 11/646,587.
Office Action dated Dec. 4, 2009 for U.S. Appl. No. 11/785,401.
Indian Office Action dated Nov. 16, 2009.
European Search Report for EP 07 10 0400 dated Oct. 20, 2010.
U.S. Office Action for 11/785,403 dated Jan. 7, 2010.
Taiwan Office Action dated Jun. 8, 2010.
Taiwan Office Action dated Jun. 9, 2010.
U.S. Notice of Allowance U.S. Appl. No. 11/646,586 dated Jul. 13, 2010.
U.S. Office Action issued in U.S. Appl. No. 11/785,405 dated Jun. 4, 2010.
Indian Office Action dated May 14, 2010. (101/MUM/2007).
Taiwanese Office Action issued in TW Application No. 095147947 dated Dec. 29, 2009 (translation).
U.S. Office Action issued in U.S. Appl. No. 11/785,400 dated Feb. 4, 2010.
U.S. Office Action issued in U.S. Appl. No. 11/646,613 dated Feb. 2, 2010, superceded by Office Action issued Mar. 8, 2010.
U.S. Office Action issued in U.S. Appl. No. 11/646,597 dated Mar. 8, 2010.
U.S. Office Action issued in U.S. Appl. No. 11/646,586 dated Mar. 10, 2010.
U.S. Office Action issued in Application No. 11/646,585 dated Mar. 18, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
Article by Greg Scoblete, Sandisk Introduces Flash Drives, MP3 Players, TWICE, Jan. 20, 2006, 21, 3; Research Library, p. 4.
U.S. Office Action reissued in U.S. Appl. No. 11/646,597 dated Mar. 24, 2010.
U.S. Office Action issued in U.S. Appl. No. 11/785,404 dated Mar. 25, 2010.
Article by Greg Scoblete, Sandisk Introduces Flash Drives, MP3 Players, TWICE, Jan. 30, 2006, 21, 3; Research Library, p. 4.
U.S. Notice of Allowance issued in U.S. Appl. No. 11/785,402 dated Mar. 25, 2010.
U.S. Office Action issued in U.S. Appl. No. 11/785,399 dated Apr. 1, 2010.
U.S. Office Action issued in U.S. Appl. No. 11/785,403 dated May 12, 2010.
U.S. Office Action U.S. Appl. No. 11/785,404 dated Sep. 1, 2010.
U.S. Office Action U.S. Appl. No. 11/646,585 dated Sep. 16, 2010.
Taiwan Office Action dated Aug. 27, 2010 (Application No. 095147944).

U.S. Office Action issued in U.S. Appl. No. 11/785,403 dated Oct. 25, 2010.
Taiwanese Office Action dated Jun. 15, 2010.
U.S. Office Action U.S. Appl. No. 11/646,613 dated Aug. 4, 2010.
Final U.S. Office Action issued in U.S. Appl. No. 11/785,399 dated Nov. 16, 2010.
Final U.S. Office Action issued in U.S. Appl. No. 11/785,405 dated Nov. 22, 2010.
U.S. Office Action issued in U.S. Appl. No. 11/646,597 dated Dec. 21, 2010.
Supplemental Final U.S. Office Action issued in U.S. Appl. No. 11/785,399 dated Jan. 4, 2011.
U.S. Office Action issued in U.S. Appl. No. 11/646,613 dated Jan. 6, 2011.
U.S. Office Action issued in U.S. Appl. No. 11/646,585 dated Jan. 13, 2011.
U.S. Office Action issued in U.S. Appl. No. 11/785,404 dated Mar. 1, 2011.
U.S. Office Action issued in U.S. Appl. No. 11/646,613 dated Mar. 7, 2011.
U.S. Office Action issued in U.S. Appl. No. 11/785,399 dated Mar. 16, 2011.
U.S. Office Action issued in U.S. Appl. No. 11/646,597 dated May 19, 2011.
U.S. Office Action issued in U.S. Appl. No. 11/785,405 dated Jun. 7, 2011.
U.S. Office Action issued in U.S. Appl. No. 11/785,403 dated Jun. 22, 2011.

* cited by examiner

TOUCH SCREEN DEVICE AND METHOD OF SELECTING FILES THEREON

BACKGROUND

1. Field

A touch screen device and method of operating a touch screen device are disclosed herein.

2. Background Art

Portable digital equipment, such as, for example, MP3 players, portable multimedia players (PMP), personal digital assistants (PDA), notebook computers or the like which are able to execute, for example, MP3 files (e.g., audio files), video files (e.g., avi files) and the like store a plurality of MP3 files and/or video files and play the files selected at the request of a user. In addition to essential data, a variety of additional information on the relevant file(s), such as, for example, title and singer information, is contained and recorded as tag information in the MP3 files and/or video files.

Selection and playback of these audio or video files may be done by manipulating keys on a keypad provided with the digital equipment. For example, files may be selected and played back one by one, a plurality of files may be selected at one time and sequentially played back, or a file may be selected from a plurality of files and repeatedly played back based on user preferences.

Because it is preferable that the aforementioned MP3 player, PMP, PDA and the like have as large a display as possible, touch screens have been employed as a user information input device instead of the conventional keypad. A touch screen may function as both a display and an input device, thus allowing information to be input or selected using, for example, a finger or stylus pen and the relevant information to be displayed based on the input or selection. When a list of audio or video files is displayed on a touch screen, a user may touch and select desired files from the file list, and the selected files will be played back by a predetermined program (e.g., a music playback program, Windows Media Player and the like).

If there is an undesired music file next to the file currently being played back in the list, the undesired file is skipped and the next music is thus selected. However, if there are at least two or more undesired files in the list, it is inconvenient to select and skip the relevant music files one by one in order to skip all the undesired music files.

Further, if files to be executed are spaced apart from a current position within the list, the files must be located by scrolling through the list on the screen. A scroll bar displayed at one side of the screen may be touched to perform a scrolling operation. However, the scroll speed is always kept at a constant level, resulting in a slow, tedious process when scroll length is long or the scroll is stopped beyond a desired position when the scroll length is short.

BRIEF DESCRIPTION OF THE DRAWINGS

Embodiments will be described in detail with reference to the following drawings, in which like reference numerals refer to like elements, wherein.

DETAILED DESCRIPTION

Figure 1:
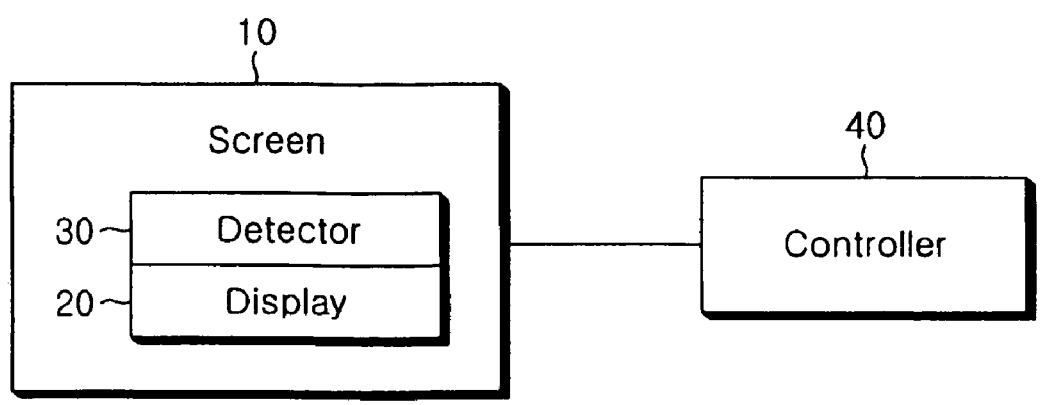
FIGS. 1 and 2 are block diagrams of a touch screen device, in accordance with embodiments.

As shown in FIG. 1, a touch screen device in accordance with an embodiment may include a screen 10 which allows information to be input and displayed. The screen 10 may include a display 20 for displaying a plurality of file lists 50 and other data thereon, and a touch panel or detector 30, for detecting a touching action related to selecting the file lists 50 or data displayed on the display 20. It is noted that a touch may be any type of direct or indirect touch or contact using an appropriate touching implement. Thus, when a user touches the screen 10 using a touching implement, such as, for example, a finger, a stylus pen, or the like, the detector 30 may detect a touch point, and more particularly, an initial touch point, and movement of the touch point (hereinafter, referred to as a 'drag'). The detector 30 may also detect a direction, speed, and trajectory associated with the drag.

The display 20 may be any type of general screen display device, including, but not limited to, display devices such as, for example, a liquid crystal display (LCD), a plasma display panel (PDP), a light emitting diode (LED), or an organic light emitting diode (OLED). The detector 30 may be a thin layer provided on a surface, such as the front surface of the display 20, and may employ a resistive or capacitive method. A touch screen that utilizes infrared rays or the like may also be used.

In the case of a resistive touch screen, the touch screen may include two layers coated with resistive materials and positioned at a constant interval, with electric currents supplied to both layers. If pressure is applied to one of the layers, causing that layer to come into contact with the other layer, an amount of electric current flowing along the layers may be changed at the contact point, and a touched point is thus detected based on the change in electric current. In contrast, in the case of a capacitive touch screen, the touch screen may include a glass layer with both surfaces coated with conductive material. Electric voltage is applied to edges of the glass, causing high frequencies to flow along the surface of the touch screen. A high frequency waveform may be distorted when pressure is applied to the surface of the touch screen. Thus, a touched point may be detected by a change in the waveform.

The screen 10 shown in FIG. 1 may be connected to a controller 40. The controller 40 may control the preparation and execution of the file list 50 based on a selection determination made by the detector 30 and the display of various kinds of information (including the file list) onto the screen 10. The controller 40 may control not only the display 20, but also the overall operation of the digital equipment in which it is installed. Further, the controller 40 may operate the digital equipment based on the detection results of the detector 30.

When selecting and executing files, the controller 40 may skip specific files, or may change an execution order of specific files. The controller 40 may determine the point and type of the user's drag and then skip the files included within a range corresponding to a drag trajectory. The drag trajectory may be set at a diagonal on a screen. If the drag trajectory is actually a return trajectory, that is, if the touch is maintained through the drag, returned to the initial touch point, and then released at the initial touch point, the detector 30 may change the execution order of the files included within a range corresponding to the drag trajectory, and execute the files in the changed execution order.

If the drag trajectory is performed in a vertical direction, the controller 40 may upwardly and downwardly move (scroll) the file list 50. In this case, the speed and direction of the scroll may correspond to the speed and direction of the drag. The controller 40 may continue the scroll until the touch is released.

Figure 2:
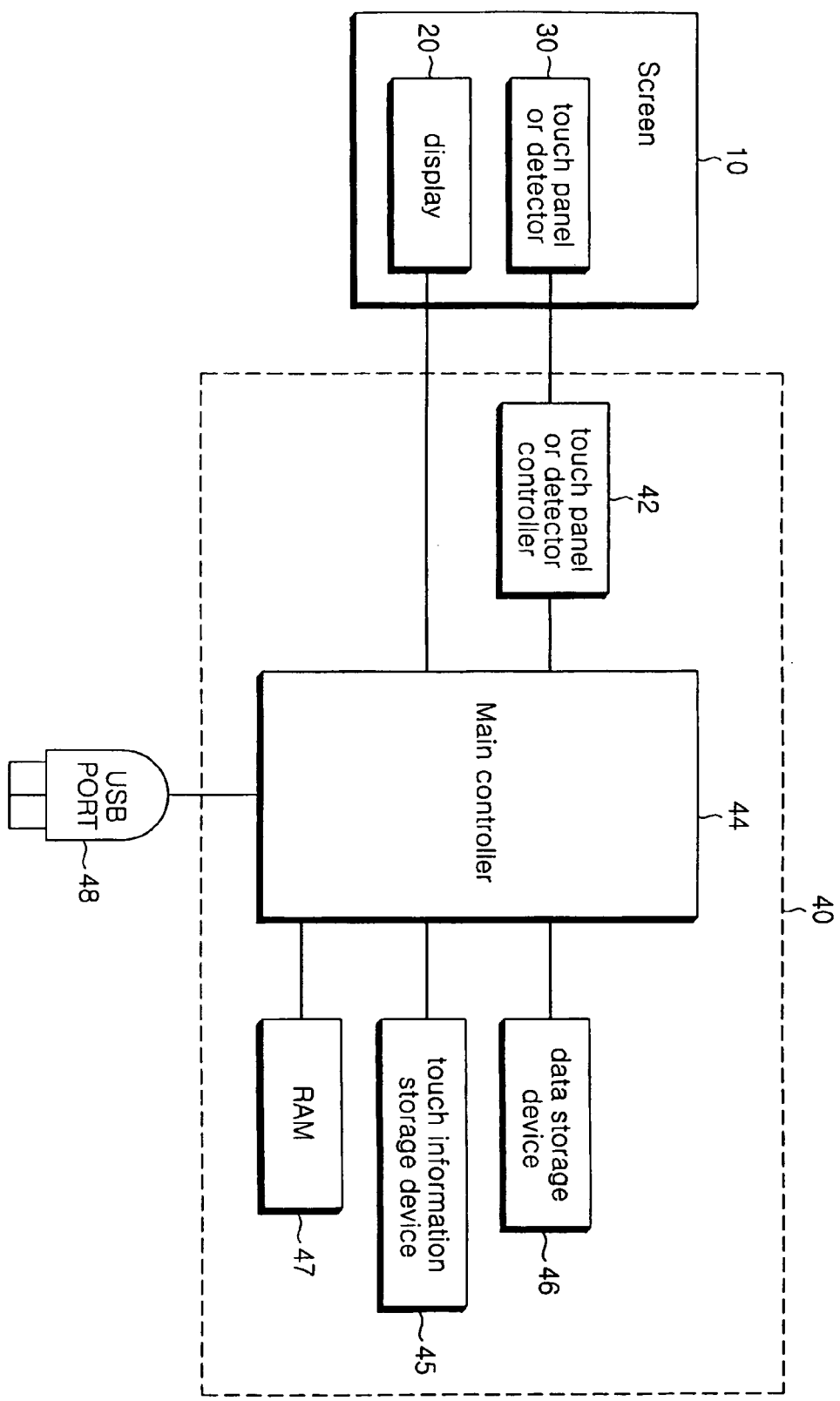

FIG. 2 is a block diagram illustrating a touch screen device according to an embodiment in more detail. The screen 10 may include a touch panel or detector 30 and a display 20. The display may be, for example, a thin film transistor liquid crystal display (TFT-LCD).

A touch panel or detector controller 42 may convert a touch detected on the touch panel or detector 30 to a corresponding signal. For example, the touch panel or detector controller 42 may convert a change in an amount of electric current or high frequency waveform corresponding to an input position on the touch panel or detector 30 into a digital signal. The display 20 and the touch panel or detector controller 42 are connected to a maim controller 44 and each may operate under the control of the main controller 44. Further, the main controller 44 may be configured such that a touch type may be detected by extracting a touch point and moving speed from digital signals input from the touch panel or detector controller 42, as described above.

A touch information storage device 45 for storing information on an execution command based on a particular touch type may be connected to the main controller 44. The execution command information stored in the touch information storage unit 45 may be classified by operation mode and may contain execution commands corresponding to specific touch types.

Examples of execution commands corresponding to the moving direction and speed of the touch in a certain operation mode are shown in Table 1.

TABLE 1

<Playback List Selection Mode>

| Type | Speed | | | |
|---|---|---|---|---|
| | 1 S/Cm or less | 1~2 S/Cm | 2~4 S/Cm | 4 S/Cm or more |
| Move downward from upper right | Move playback list downward at speed of 1 S/Cm | Move playback list downward at speed of 2 S/Cm | Move playback list downward at speed of 4 S/Cm | Move playback list downward at speed of 5 S/Cm |
| Move upward from lower right | Move playback list upward at speed of 1 S/Cm | Move playback list upward at speed of 1 S/Cm | Move playback list upward at speed of 1 S/Cm | Move playback list upward at speed of 1 S/Cm |
| Move from upper left to lower right | Skip playback list in touched area | | | |
| Move from upper right to lower left | Delete playback list in touched area | | | |

A data storage device 46 for storing a variety of information, such as, for example, MP3 files and the like, may be connected to the main controller 44. In certain embodiments, a NAND memory capable of rapidly and easily storing and reading out a large amount of information may be used as the data storage device 46.

A portion of the data storage device 46 may be used as the touch information storage device 45. However, a separate touch information storage device 45 may be used. For example, use of a touch information storage device 45 constructed of, for example, a NOR memory can provide better, more reliable and stable information may be advantageous.

A universal serial bus (USB) port 48 may be connected to the main controller 44 to provide an interface for modifying data. The USB port 48 may be connected to an external device such that partition information and data stored in the data storage device 46 may be updated, deleted, or otherwise modified as necessary.

The main controller 44 may also have a random access memory (RAM) 47 for driving the display. In certain embodiments, a synchronous dynamic RAM (SDRAM) may be used.

Hereinafter, a method of skipping files or changing the execution order of the files and a method of scrolling through a file list will now be discussed with respect to FIGS. 3 and 4.

Figure 3:
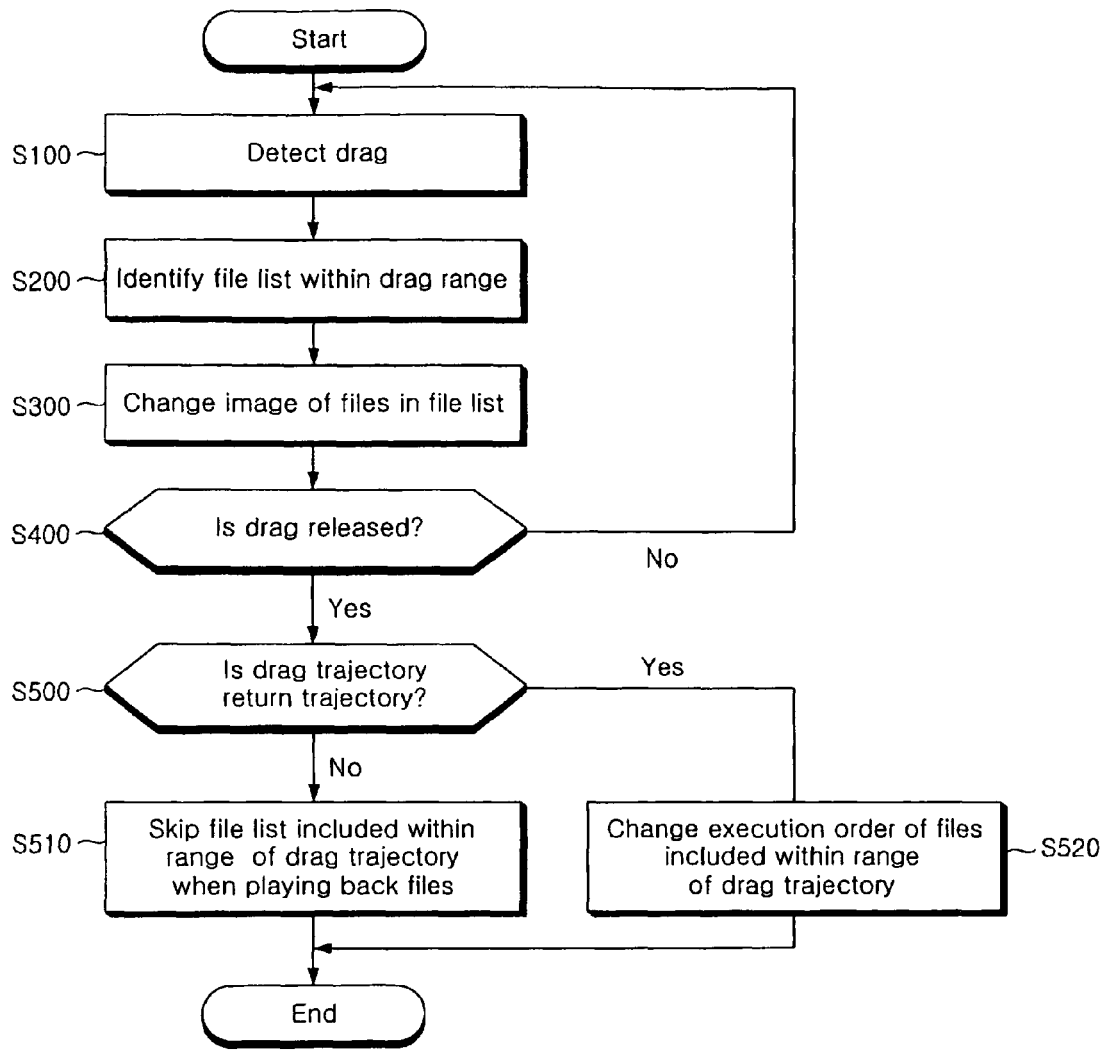
FIG. 3 is a flowchart of a method of skipping files, in accordance with an embodiment.

FIG. 3 is a flowchart of a method of skipping execution files in accordance with an embodiment. First, the system may be activated as the detector 30 detects a drag, in step S100. That is, if an execution file list 50 is displayed on the display 10, the detector 30 may detect the user's drag on the screen. The drag may follow a diagonal shape where both X and Y coordinates are changed. That is, when the diagonal drag is performed, the detector 30 may recognize the diagonal drag as a drag input for skipping files.

If a diagonal drag is performed, the controller 40 may identify files included within a range corresponding to the drag trajectory, in step S200. The range corresponding to the drag trajectory may be a range included within a rectangle defined by the diagonal drag trajectory. For example, if the drag is moved from a coordinate (X1, Y1) to a coordinate (X2, Y2), the range corresponding to the drag trajectory may be a range including the interior of a rectangle having four apexes with the coordinates (X1, Y1), (X2, Y2), (X2, Y1) and (X2, Y2).

It is noted that, in certain embodiments, as a diagonal drag is performed and the drag reaches the bottom right corner of the screen 10, as shown, for example, in FIG. 4A, the file list 50 may continue to scroll, and the drag may continue further down the file list 50 to include more files within the range marked by the drag as long as the touch is not released. In other embodiments, preferences may be set to limit the length of the diagonal drag to the diagonal of the screen, thus stopping the related scrolling action, if so desired.

Then, the controller 40 may change and display the image of the selected file(s), in step S300. This change of image may include changing an appearance of the selected file(s), such as, for example, colors, fonts, styles of letters, the background color, and the like. This allows a user to easily confirm whether the file(s) intended for selection by the user are the same as the file(s) detected by the detector 30. In certain embodiments, after the file(s) are selected, the controller 40 may check whether the drag is released, in step S400. The file skip command may be executed when the drag is released.

When the drag is released, a command to skip the files and execute the next file may be executed. However, before skipping the files, the controller 40 may check whether a user intends to change an execution order of the files. If the detector 30 detects that the drag trajectory is a return drag trajectory, this may indicate a change in the execution order of the files is desired. Therefore, the controller 40 may check whether the drag trajectory is a return trajectory, in step S500.

If the drag trajectory is not a return drag trajectory, a command to skip the files selected by the drag may be performed when the files in the file list 50 are sequentially executed, in step S510. If the drag trajectory is a return drag trajectory, the execution order of the files included within the range of the drag trajectory may be changed, in step S520. As discussed above, the range of files associated with the drag trajectory may be a range within a rectangle defined by a diagonal equal to a maximum drag distance. That is, the rectangle may be a quadrangle with a diagonal equal to a straight line that connects the start point of the drag to a point having the maximum X and Y coordinates from the start point. The change in execution order of the selected files may be made in various ways. However, the execution order of the files included within the range may be changed in a reverse order. If the files are skipped or their execution order is changed by the drag, the remaining files may be executed as appropriate.

Figure 4:
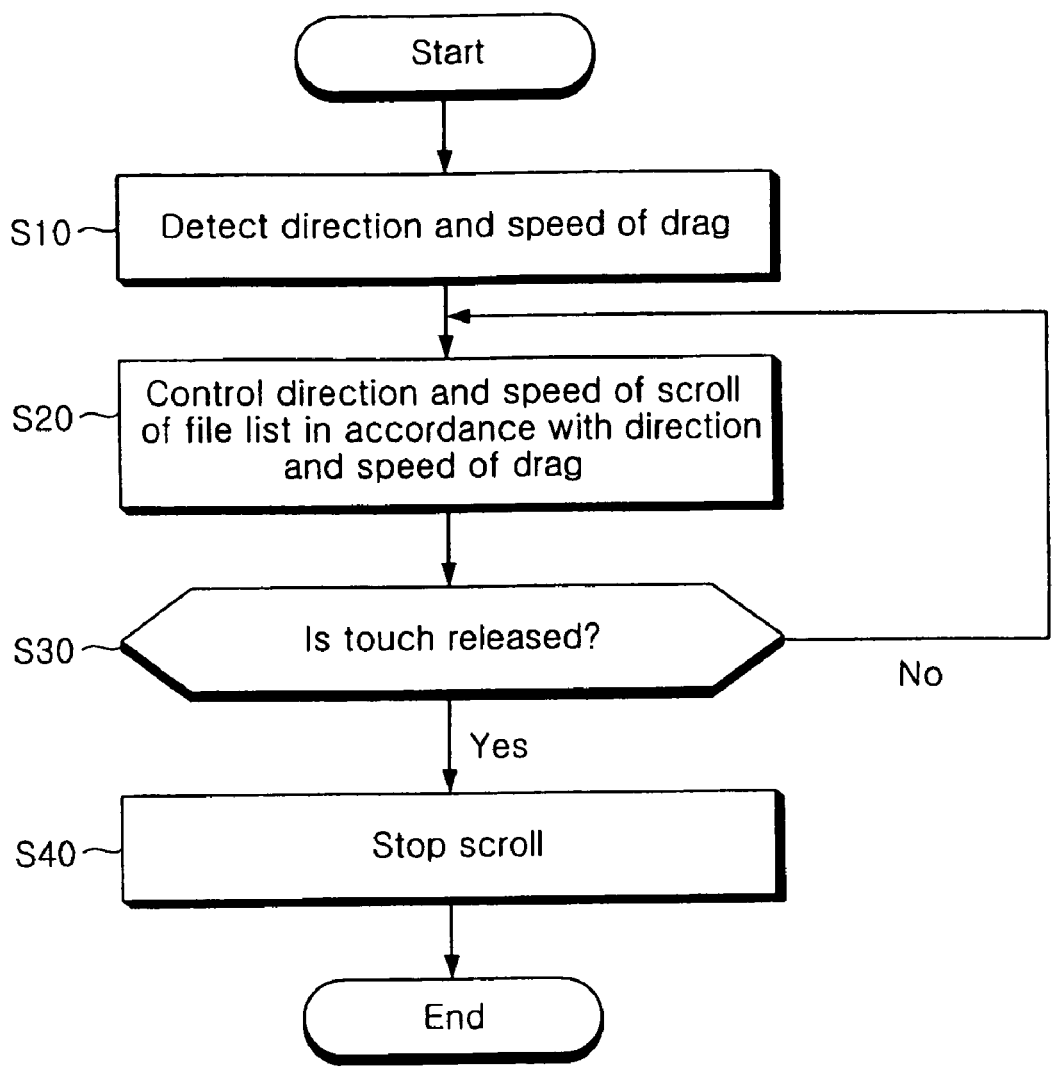
FIG. 4 is a flowchart of a method of scrolling a file list, in accordance with an embodiment.

A method of scrolling through the file list 50 is shown in FIG. 4. The system may be activated as the detector 30 detects the user's drag, in step S10. The detector 30 may detect the direction and speed of the drag at the same time. The drag direction may be detected by changes in the coordinate(s) of the drag point. The drag speed may be detected by changes in the coordinate(s) per unit time. It is noted that, although these drags are illustrated as vertical drags in the examples shown in FIGS. 5A-5C, it is well understood that this scrolling may also be done with different orientations of file lists and associated scrolling action. For example, vertical columns of file lists may be scrolled from left to right or right to left using horizontal drags. Likewise, although the drags are shown at the right edge of the screen, it is well understood that a drag may be performed at any point within a prescribed active area of the screen, as long as the corresponding drag trajectory is followed. For example, the vertical drag illustrated on the right edge of the screen in FIGS. 5A-5C may also be done at a center or left edge of the screen 10, as long as the orientation of the drag remains vertical and the initiation touch point is within a prescribed portion of the screen.

Figure 5A:
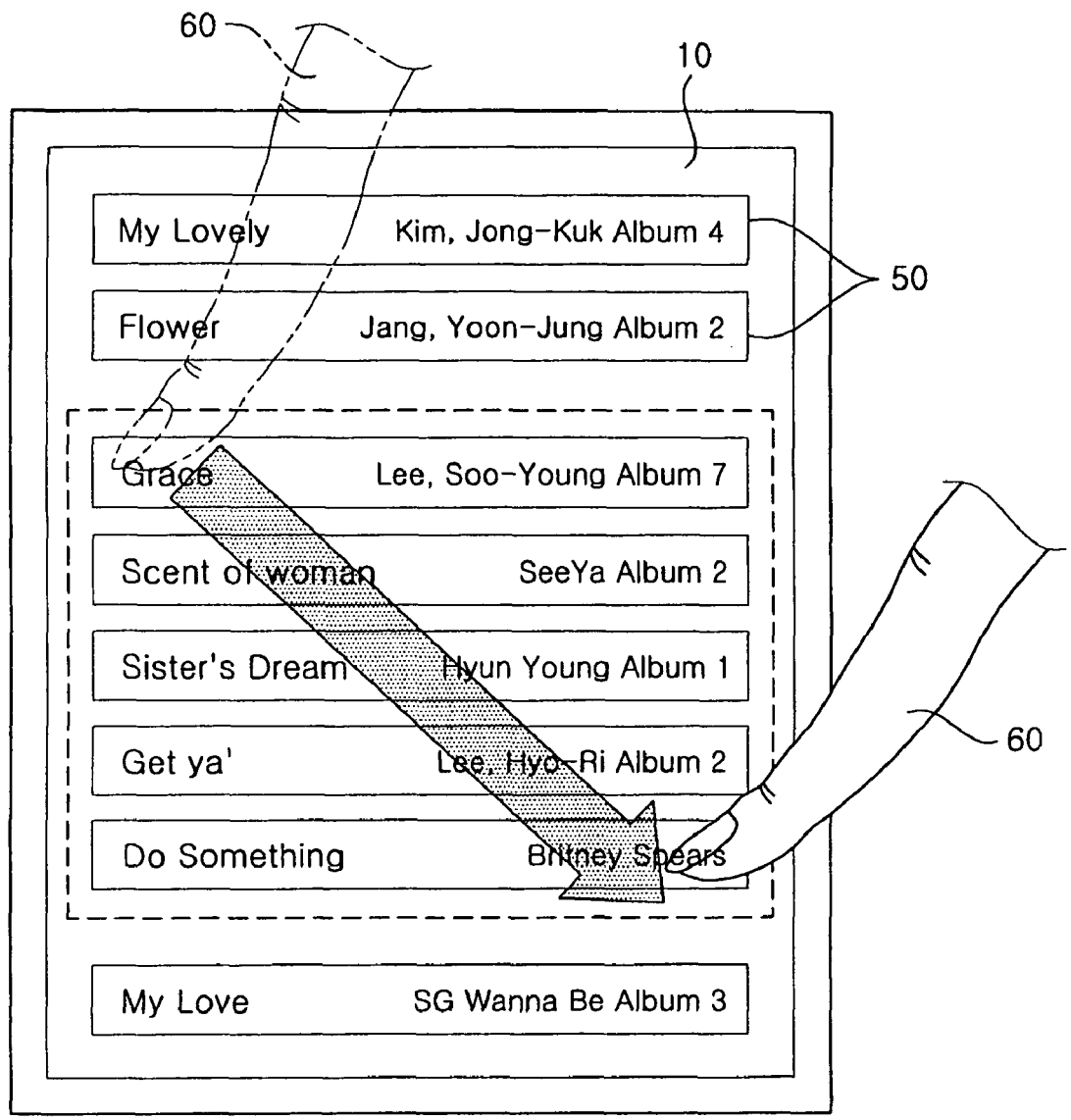
FIGS. 5A and 5B illustrate a file skipping operation, in accordance with an embodiment.
Figure 5B:
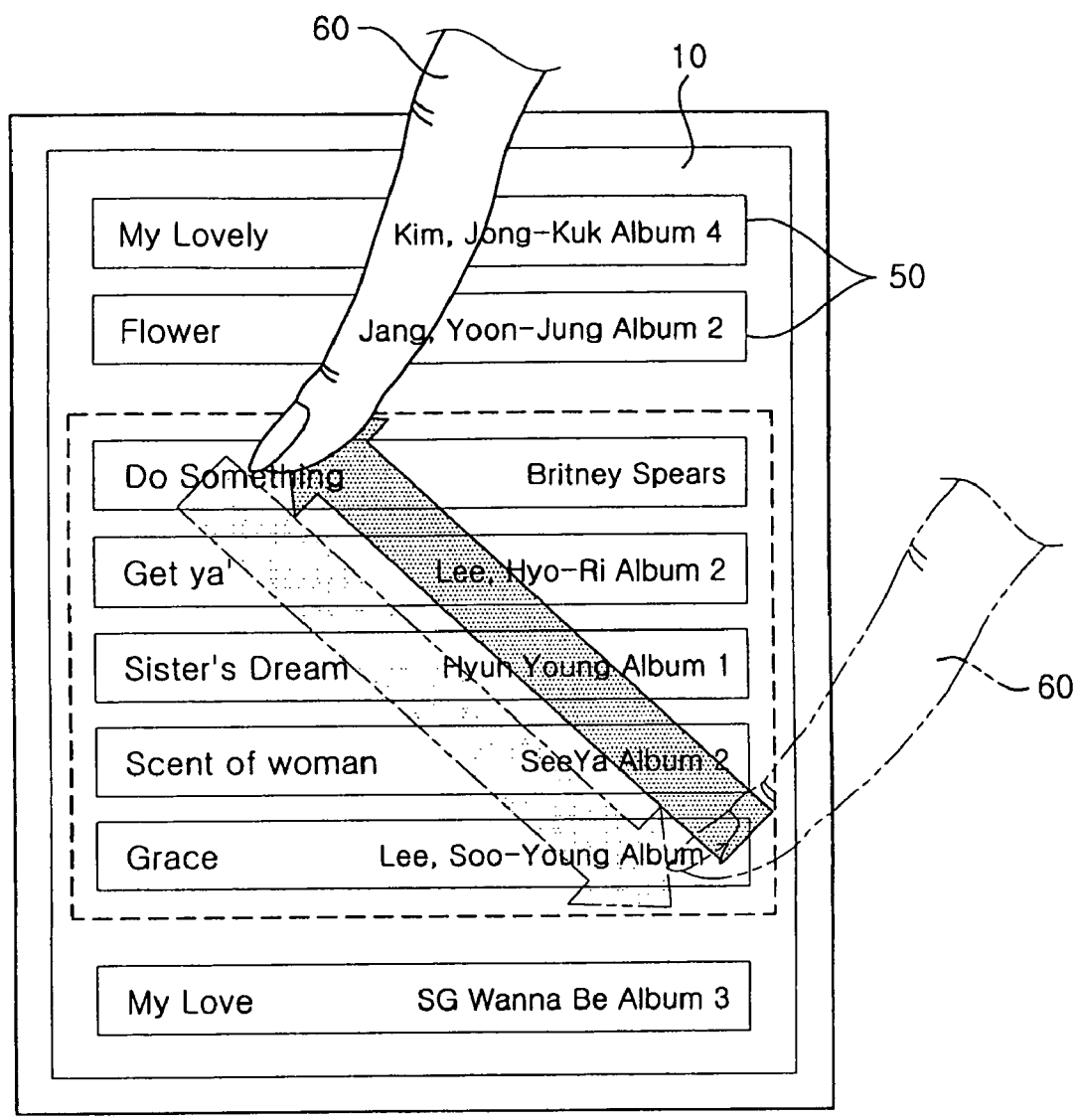

If a drag is detected, the controller 40 may scroll through the file list 50 in accordance with the direction and speed of the drag, in step S20. In this example, if the drag direction is upward, the controller 40 may scroll through the file list 50 upward. If the drag direction is downward, the controller 40 may scroll through the file list 50 downward. The scroll direction may also be adjusted based on user preferences, such as, for example, opposite to that which is discussed above. FIGS. 5A and 5B illustrate an example in which the drag direction and the scroll direction are opposite to each other.

As discussed above, the scroll speed of the file list 50 may correspond to the drag speed. That is, the file list 50 may be scrolled at a fast speed if the drag speed is fast, while the file list 50 is scrolled slowly if the drag speed is slow. As the file list 50 is scrolled, the detector 30 may detect whether the drag is released, in step S30. If the drag is released, the scroll may also stop, in step S40. However, if the drag is not released, the scroll may be continued at the same speed and direction until the drag is released.

Operation of the touch screen device in accordance with an embodiment executed according to the aforementioned method will now be described.

FIG. 5A illustrates an operation of skipping files, and FIG. 5B illustrates an operation of changing the execution order of files, in accordance with embodiments.

As shown in FIG. 5A, if a user touches the touch screen and drags on the screen in a diagonal direction, a rectangle with a diagonal corresponding to the drag trajectory may be formed. The files included within the rectangle are the selected files which will be either skipped or whose execution order may be changed. The files selected as such may be displayed in a state in which some aspect of their appearance on the screen is changed. For example, background color of the selected files may be changed to easily identify the selected files to the user. If the user releases the touch, the selected files may be skipped and the next files executed. However, if the user does not release the touch at the end of the diagonal, and instead drags in a reverse direction and then releases the drag at the initial touch point, the controller 40 may change the execution order of the files included within the range corresponding to the drag trajectory, as shown in FIG. 4B.

Figure 6A:
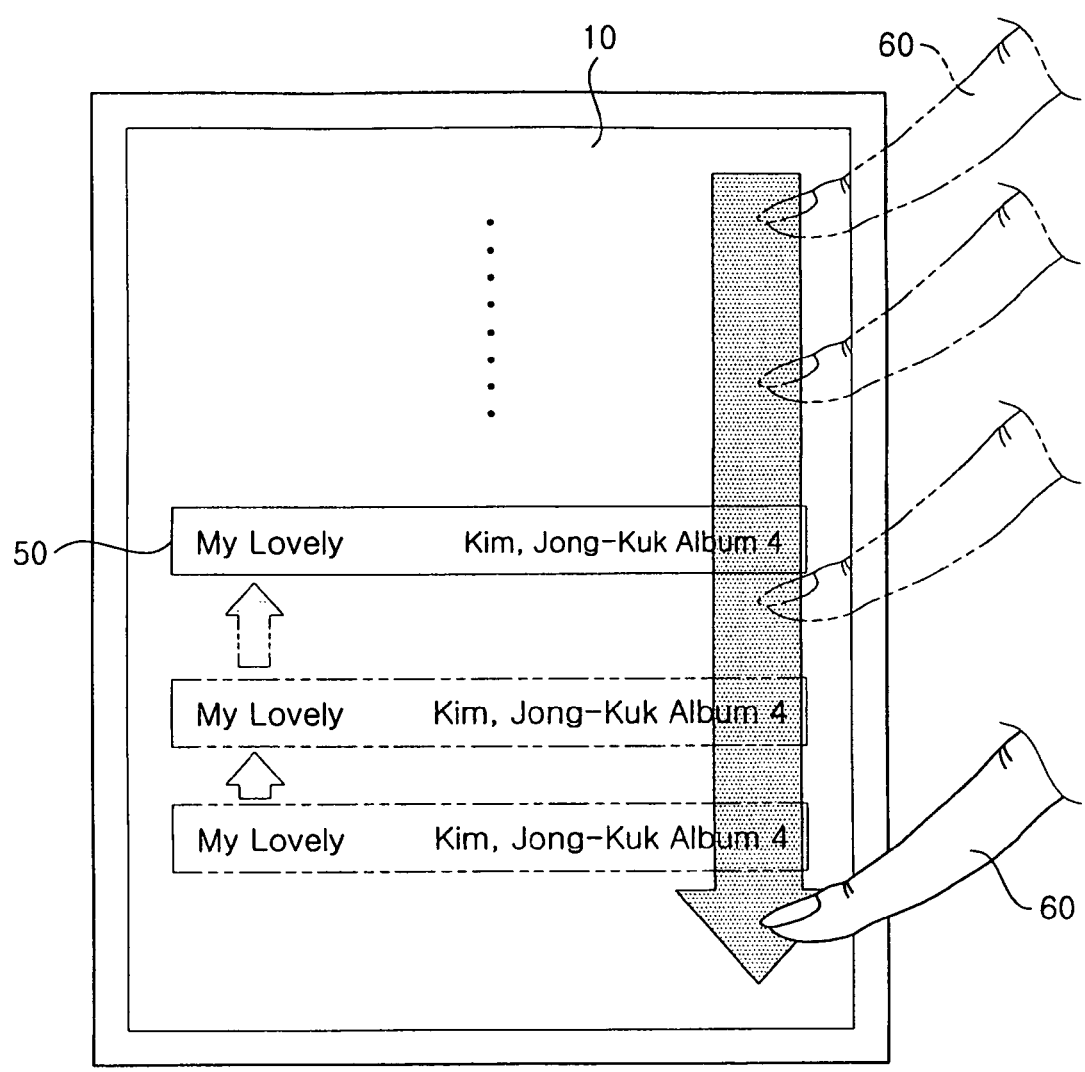
FIGS. 6A-6C illustrate a file scrolling operation, in accordance with an embodiment.
Figure 6B:
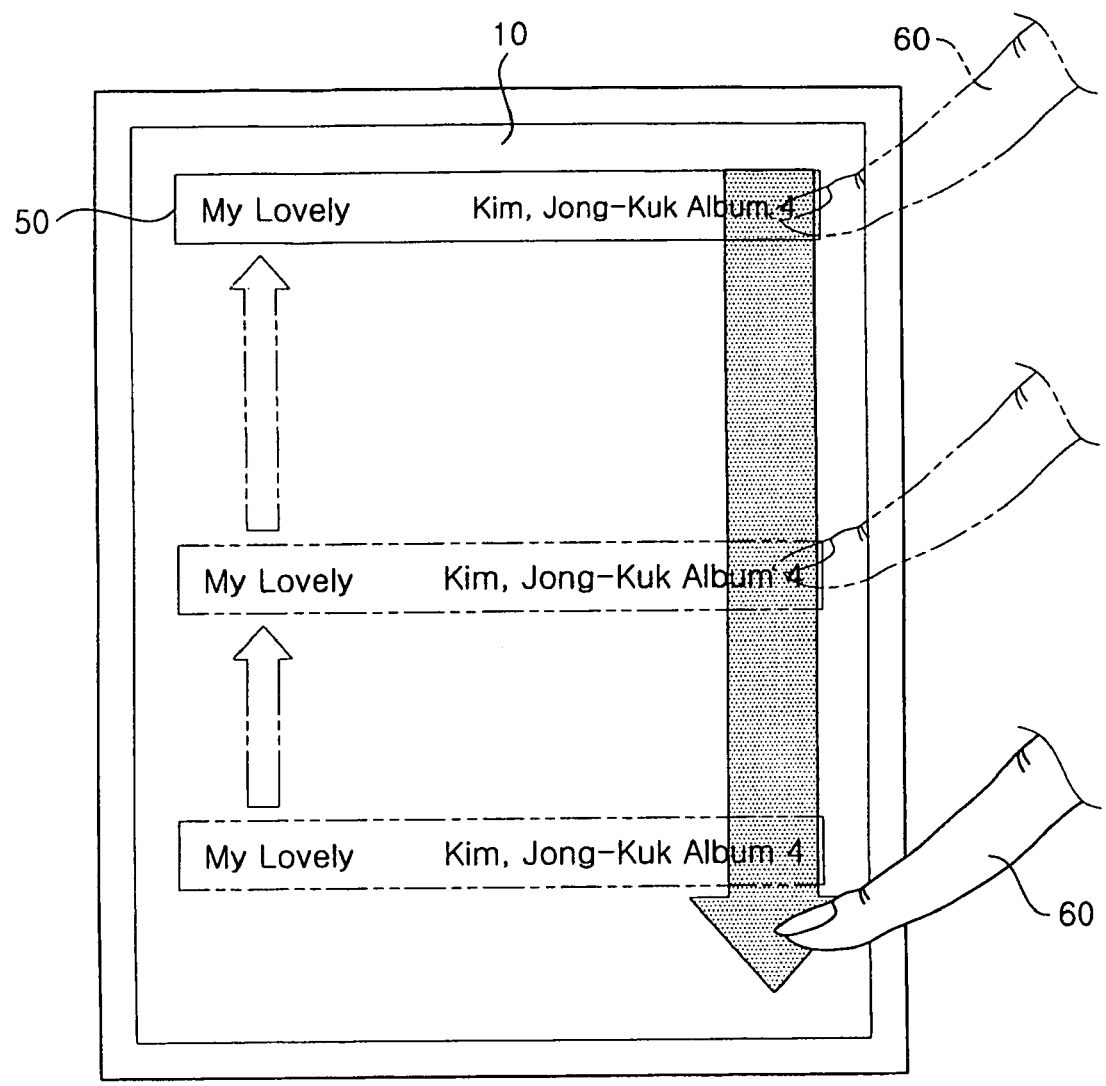
Figure 6C:
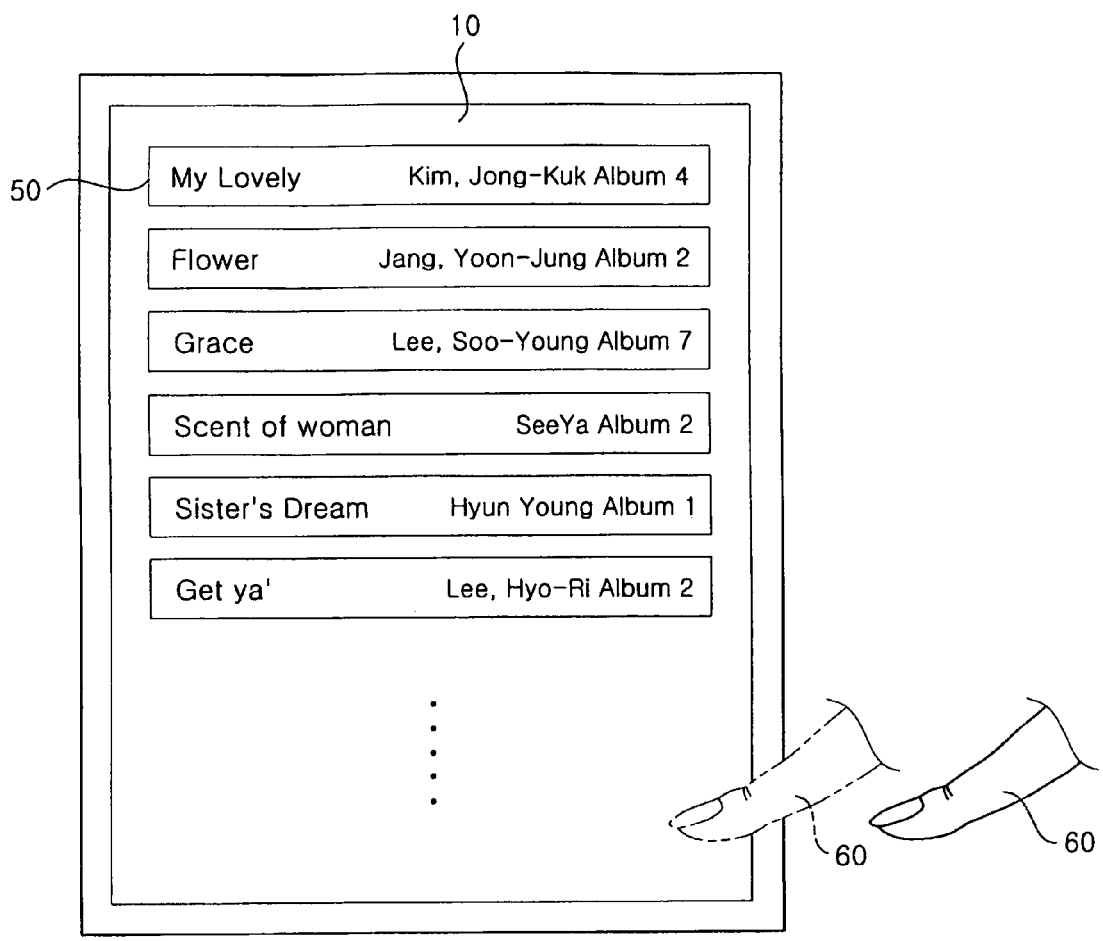

FIGS. 6A-6C illustrate an operation of scrolling through a file list, in accordance with embodiments.

As a user touches a portion of the screen 10, for example, one side on the screen 10 as shown in FIG. 6A, and drags in a vertical direction, the file list 50 also may scroll downwardly or upwardly. At this time, the scroll speed of the file list 50 may be proportional to the drag speed. FIG. 6A shows that the file list 50 may scroll slowly since the drag speed is slow, and FIG. 6B shows that the file list 50 may scroll fast since the drag speed is fast. As long as the user does not release the touch, scrolling may be continued. However, if the user releases the touch after the drag, scrolling may be stopped, as shown in FIG. 6C.

A touch screen device and a method of selecting files in accordance with embodiments broadly described herein may provide at least the following advantages.

A skip command may be issued by a single drag rather than by individual, one by one, selection of the files to be skipped. Thus, a process of reconfiguring the list of files to be executed may be significantly simplified.

Further, an execution order of files may be easily changed by dragging the files on a screen. Thus, a process of selecting files on the touch screen device, and particularly for changing the execution order thereof, may also be significantly simplified.

Additionally, a scroll speed may be changed in accordance with a corresponding drag speed thus allowing a used rapidly and correctly locate a desired file. Furthermore, the touch screen device may identify the type of a user's touch and operates in accordance with the user's intention, thus providing an intelligent user interface.

The touch screen device in accordance with embodiments may be used in or formed as a display for electronic books, newspapers, magazines, and the like, different types of portable devices, such as, for example, handsets, MP3 players, notebook computers, and the like, audio applications, navigation applications, televisions, monitors, or other types of devices using a display, either monochrome or color.

Embodiments provide a touch screen device and a method of selecting files, wherein a plurality of files among files included in a file list may be skipped at one time, or an execution order thereof may be changed through a drag input on the touch screen. Further, embodiments provide a touch screen device and a method of selecting files, wherein the scroll speed and direction of a file list vary according to the drag speed and direction on a touch screen.

In accordance with one embodiment broadly described herein, there is provided a method of selecting files on a touch screen, including detecting a drag on a screen, detecting a file list included within a range corresponding to a drag trajectory, and skipping files included in the detected file list. In certain embodiments, the range corresponding to the drag trajectory may be a range within a rectangle which has a diagonal equal to a straight line which connects start and release points of the drag with each other. In certain embodiments, the method may also include determining whether the drag trajectory is a return trajectory, and changing an execution order of files in the detected file list if it is determined that the drag trajectory is a return trajectory. The detection of the files may be made within a range corresponding to a rectangle with a diagonal equal to a maximum distance of the drag trajectory. Further, the files in the file list may be arranged again in a reverse order.

In certain embodiments, the method may also include changing at least one of a size, a color of letter, and a background color of the file list selected by the drag. Further, the file may be one of an audio file, a video file, or a graphic file.

In accordance with another embodiment broadly described herein, there is provided a method of selecting files on a touch screen, including detecting a touch and a drag of the touch on a screen, extracting a direction and speed of the drag, and scrolling a file list in accordance with the extracted direction and speed of the drag. In certain embodiments, the method may also include detecting release of the touch, and stopping the scroll if it is determined that the release of the touch is detected. The direction and speed of the drag may be extracted from a touch point and a release point of the touch on the screen, and a time taken to move between the two points.

In accordance with another embodiment broadly described herein, there is provided a touch screen device, including a screen unit with a display unit for displaying a file list thereon and a detection unit for detecting a touch on a screen by a user, and a control unit for controlling operations of the device in accordance with the touch on the screen detection by the detection unit. When a drag is performed on the screen, the control unit may skip files in the file list included within a range corresponding to a drag trajectory and executes files next to the skipped files. Further, the controller may determine whether the drag trajectory is a return trajectory, and an execution order of files in the file list within a range corresponding to the drag trajectory may be changed if it is determined that the drag trajectory is a return trajectory.

In accordance with still another embodiment broadly described herein, there is provided a touch screen device, including a screen unit with a display unit for displaying a file list thereon and a detection unit for detecting a touch and drag on a screen by a user, and a control unit for controlling operations of the device in accordance with the touch and drag on the screen detected by the detection unit. The control unit may extract a direction and speed of the drag and cause the file list to scroll in accordance with the extracted direction and speed of the drag. Further, the control unit may detect release of the touch by the user and stop the scroll if the touch is released.

In accordance with another embodiment broadly described herein, there is provided digital equipment provided with a touch screen device, including a screen unit with a display unit for displaying a file list thereon and a detection unit for detecting a touch on a screen by a user, and a control unit for controlling operations of the device in accordance with the touch on the screen detected by the detection unit, wherein when a drag is performed on the screen, the control unit may skip files in the file list included within a range corresponding to a drag trajectory and executes files next to the skipped files.

In accordance with another embodiment broadly described herein, there is provided digital equipment provided with a touch screen device, including a screen unit with a display unit for displaying a file list thereon and a detection unit for detecting a touch and drag on a screen by a user, and a control unit for controlling operations of the device in accordance with the touch and drag on the screen detected by the detection unit, wherein the control unit may extract a direction and speed of the drag and cause the file list to scroll in accordance with the extracted direction and speed of the drag.

In accordance with embodiments so configured, a plurality of desired files may be selected at a time such that the selected files may be skipped or their execution orders may also be changed. Further, the scroll speed of a file list may vary according to the drag speed on the touch screen.

An embodiment may be achieved in whole or in part by a method of selecting files on a touch screen, comprising detecting a touch drag on a screen, detecting a file list included within a range corresponding to a touch drag trajectory of the detected touch drag, and marking the detected file list for a subsequent execution action. Detecting a drag on a touch screen may include detecting an initial touch and a touch movement on the screen, wherein the drag trajectory corresponds to a direction of the touch movement. Marking the detected filed list for a subsequent execution action may include skipping files included in the detected file list. Also, marking the detected file list for a subsequent execution action may include changing an execution order of files in the detected file list.

Further, the range corresponding to the touch drag trajectory may be a range defined by a rectangle with a diagonal equal to a straight line which connects a start point and a release point of the touch drag. The method may further include determining whether the touch drag trajectory is a return trajectory, and changing an execution order of files in the detected file list if it is determined that the touch drag trajectory is a return trajectory, wherein the detected file list may be within a range corresponding to a rectangle with a diagonal equal to a maximum distance of the touch drag trajectory. Changing an execution order of files in the detected file list may include rearranging the execution order of the files in accordance with user preferences. Also, changing an execution order of the files in the detected file list may include reversing an execution order of the files included in the detected file list.

The method may also include changing an appearance or a background color of the files included in the detected file list. Changing an appearance of the files included in the detected file list may include changing at least one of a size, a letter color, or a background color of the files included in the detected file list. Further, the files included in the detected file list may be one of an audio file, a video file, or a graphic file.

Another embodiment may be achieved in whole or in part by a method of selecting files on a touch screen, including detecting a touch and a touch drag on a screen, determining a direction and a speed of the touch drag, and scrolling a file list displayed on the screen based on the determined direction and speed of the drag. The method may further include stopping the scrolling if a release of the touch is detected. Further, the direction and speed of the drag may be based on a touch point and a release point of the touch on the screen, and a time taken to move between the touch point and the release point.

Another embodiment may be achieved in whole or in part by a touch screen device, including a screen including a display configured to display a file list thereon and a detector configured to detect a touch on a screen, and a controller configured to control operation of the device based on the touch on the screen detected by the detector, wherein, when a drag is detected on the screen, the controller is configured to skip files in the file list included within a range corresponding to an associated drag trajectory and to execute files adjacent the skipped files. The controller may be configured to determine whether the drag trajectory is a return trajectory, and to change an execution order of files in the file list if the drag trajectory is a return trajectory. Also, the controller may be configured to determine that the drag trajectory is a return trajectory if a touch release point is substantially the same as an initial touch point.

Further, the controller may be configured to change an execution order of files within a range in the file list corresponding to the drag trajectory if the drag trajectory is a return trajectory. Furthermore, the controller may be configured to reverse an execution order of files in the file list if the drag trajectory is a return trajectory. Also, the controller may be configured to rearrange an execution order of the files in the file list in accordance with user preferences if the drag trajectory is a return trajectory.

Another embodiment may be achieved in whole or in part by a touch screen device, including a screen including a display configured to display a file list thereon and a detector configured to detect a touch and a drag on a screen, and a controller configured to control operation of the device based on the touch and the drag on the screen detected by the detector, to determine a direction and a speed of the drag, and to scroll the file list based on the determined direction and speed of the drag. The controller may be configured to detect a release of the touch and to stop the scroll if the touch is released. Digital equipment may comprise the disclosed touch screen device. Further, the digital equipment may be an MP3 player, a PMP, a PDA, a notebook computer, a mobile communication terminal, or a portable navigation terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings and the appended claims without departing from the spirit of the disclosure. In addition to variations modifications in the component parts and/or arrangements, alternative uses will also be apparent to those skilled in the art.

What is claimed is:

1. A method of selecting files using a touch screen device for a portable terminal, the portable terminal having a screen of a prescribed viewing area in x and y directions, the method comprising:
    detecting an initial touch point within a prescribed portion of the prescribed viewing area;
    detecting a moving touch trajectory in a first direction on a surface of the screen, wherein the moving touch trajectory includes a substantially straight line, the substantially straight line initiating at the initial touch point and ending at a release touch point, and is determined based on x and y coordinates of the prescribed viewing area; and
    executing at least one predetermined command based on the moving touch trajectory, the at least one predetermined command comprising at least one of detecting and marking a file list and skipping files in the file list, detecting and marking a file list and changing an execution order of files in the file list, or scrolling through a file list, wherein the executing step comprises maintaining the touch to continue scrolling until a desired file is located, and releasing the touch to mark the file list and skip the marked files in the file list, or to mark the file list and change the execution order of files in the file list, wherein when the file list is marked based on the moving touch trajectory, the file list includes files within a range that is defined by a rectangle with a diagonal equal to the substantially straight line of the moving touch trajectory, and wherein a different command is executed based on whether or not the initial touch point of the moving touch trajectory is the same as the release touch point of the moving touch trajectory.

2. The method of claim 1, wherein executing the at least one predetermined command is done by detecting the release touch point to mark the file list.

3. The method of claim 1, wherein scrolling through a file list comprises scrolling through the file list in a horizontal or vertical direction based on a direction of the moving touch trajectory.

4. The method of claim 3, wherein scrolling through a file list comprises scrolling through the file list at a speed based on a speed of the moving touch trajectory.

5. The method of claim 1, further comprising changing an appearance of the files within the range.

6. The method of claim 5, wherein changing an appearance of the files within the range comprises changing at least one of a size, a letter color, or a background color of the files.

7. The method of claim 1, further comprising skipping files within the range if the release touch point is different than the initial touch point.

8. The method of claim 1, further comprising changing an execution order of the files within the range if the moving touch trajectory includes a return trajectory in which the release touch point is substantially the same as the initial touch point.

9. The method of claim 8, wherein changing an execution order of the files within the range comprises reversing the execution order of the files within the range.

10. The method of claim 1, further comprising requesting input related to an operation to be executed after detecting a moving touch trajectory and marking a file list, but before executing the at least one predetermined command.

11. The method of claim 10, wherein requesting input related to an operation to be executed comprises requesting confirmation to proceed with execution of the at least one predetermined command.

12. A touch screen device for a portable terminal, the portable terminal having a screen with a prescribed viewing area in x and y directions, the touch screen device comprising:
    a screen, comprising:
        a display with a prescribed viewing area, wherein the display is configured to display information thereon; and
        a touch panel coupled to the display, wherein the touch panel is configured to detect an initial touch point within a prescribed portion of the prescribed viewing area, and a moving touch trajectory extending in a direction on a surface of the display, wherein the moving touch trajectory includes a substantially straight line, the substantially straight line initiating at the initial touch point and ending at a release touch point, and is based on x and y coordinates of the prescribed viewing area; and a controller coupled to the screen, wherein the controller is configured to execute at least one predetermined command based on the initial touch point and the moving touch trajectory, wherein the at least one predetermined command comprises detecting and marking a file list and skipping files in the file list, detecting and marking a file list and changing an execution order of files in the file list, or scrolling through a file list, wherein when the file list is marked based on the moving touch trajectory, the file list includes files within a range that is defined by a rectangle with a diagonal equal to the substantially straight line of the moving touch trajectory, and wherein a different command is executed based on whether or not the initial touch point of the moving touch trajectory is the same as the release touch point of the moving touch trajectory.

13. The device of claim 12, further comprising a storage device coupled to the screen and the controller and configured to store a plurality of predetermined commands corresponding to a respective plurality of initial touch points and moving touch trajectories and associated operation modes of the touch screen device.

14. The device of claim 13, wherein the controller comprises:
a touch panel controller coupled to the touch pad, wherein the touch pad controller is configured to detect a touch on the touch panel and convert the touch into a corresponding signal; and
a main controller coupled to the touch pad controller, the screen, and the storage device, wherein the main controller is configured to determine a touch type from the signal generated by the touch panel controller, to retrieve a corresponding command of the plurality of predetermined commands stored in the storage device, and to execute the retrieved command.

15. The device of claim 12, wherein the controller is configured to skip files in the file list when the moving touch trajectory includes a diagonal trajectory in which the release touch point is different that the initial touch point.

16. The device of claim 12, wherein the controller is configured to change an execution order of files in the file list when the moving touch trajectory includes a diagonal return trajectory in which the release touch point is substantially the same as the initial touch point.

17. The device of claim 16, wherein the controller is configured to reverse an execution order of the files in the file list when the moving touch trajectory includes a diagonal return trajectory.

18. The device of claim 16, wherein the controller is configured to rearrange an execution order of the files in the file list in accordance with user preferences when the moving touch trajectory includes a diagonal return trajectory.

19. The device of claim 12, wherein the controller is configured to scroll through files in the file list when the moving touch trajectory is a horizontal moving touch trajectory or a vertical moving touch trajectory.

20. The device of claim 19, wherein the controller is configured to scroll through the files in the file list at a speed corresponding to the horizontal or vertical moving touch trajectory.

21. The device of claim 19, wherein the controller is configured to continue to scroll through the files in the file list until a touch associated with the initial touch point and the moving touch trajectory is released.

22. Digital equipment comprising the touch screen device of claim 12.

23. The device of claim 22, wherein the digital equipment is an MP3 player, a PMP, a PDA, a notebook computer, a mobile telephone, or a portable navigation terminal.

* * * * *